(12) United States Patent
Hess

(10) Patent No.: US 6,813,527 B2
(45) Date of Patent: Nov. 2, 2004

(54) HIGH INTEGRITY CONTROL SYSTEM ARCHITECTURE USING DIGITAL COMPUTING PLATFORMS WITH RAPID RECOVERY

(75) Inventor: Richard Hess, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 155 days.

(21) Appl. No.: 10/300,185

(22) Filed: Nov. 20, 2002

(65) Prior Publication Data

US 2004/0098140 A1 May 20, 2004

(51) Int. Cl.$^7$ .............................................. G05B 9/02
(52) U.S. Cl. ........................... 700/82; 700/3; 700/21; 700/79; 700/81; 709/208; 709/209; 709/210; 709/211; 710/110
(58) Field of Search ......................... 700/23, 4, 5, 21, 700/79, 81, 82; 709/208, 209, 210, 211; 710/110

(56) References Cited

U.S. PATENT DOCUMENTS

| | | | |
|---|---|---|---|
| 3,805,235 A | | 4/1974 | Foster et al. |
| 4,130,241 A | | 12/1978 | Meredith et al. |
| 4,751,670 A | | 6/1988 | Hess |
| 4,996,687 A | | 2/1991 | Hess et al. |
| 5,226,152 A | * | 7/1993 | Klug et al. ................... 714/12 |
| 5,307,409 A | | 4/1994 | Driscoll |
| 5,313,625 A | | 5/1994 | Hess et al. |
| 5,343,474 A | | 8/1994 | Driscoll |
| 5,386,424 A | | 1/1995 | Driscoll et al. |
| 5,491,625 A | * | 2/1996 | Pressnall et al. ................ 700/4 |
| 5,491,787 A | * | 2/1996 | Hashemi ...................... 714/11 |
| 5,502,728 A | | 3/1996 | Smith |
| 5,502,812 A | | 3/1996 | Leyre et al. |
| 5,519,603 A | * | 5/1996 | Allbery et al. ................ 700/4 |
| 5,550,736 A | | 8/1996 | Hay et al. |
| 5,561,770 A | * | 10/1996 | de Bruijn et al. ........... 709/225 |
| 5,572,620 A | * | 11/1996 | Reilly et al. .................. 714/11 |
| 5,583,757 A | * | 12/1996 | Baca et al. ................... 700/79 |
| 5,757,641 A | | 5/1998 | Minto |
| 5,778,206 A | * | 7/1998 | Pain et al. .................. 710/305 |
| 5,909,541 A | | 6/1999 | Sampson et al. |

(List continued on next page.)

FOREIGN PATENT DOCUMENTS

| | | |
|---|---|---|
| EP | 0271807 A | 6/1988 |
| EP | 0743583 A | 11/1996 |
| WO | WO 0036492 A | 6/2000 |
| WO | WO 02073505 A1 | 9/2002 |

OTHER PUBLICATIONS

Smith, T.J. et al., "Processor Architectures for Fault Tolerant Avionics Systems," IEEE, Oct. 14, 1991, pp. 213–219, figure 2.

Li Zhaohui et al., "Fault Tolerance Aspects of a Highly Reliable Microprocessor–Based Water Turbine Governor," IEEE Transactions on Energy Conversion, IEEE INc. NY, US, vol. 7, No. 1, Mar. 1, 1992, pp. 1–7, paragraph '0031.

*Primary Examiner*—Ramesh Patel

(57) ABSTRACT

A control system architecture suitably includes sufficient computation redundancy and control command management to isolate and recover a faulted processor and/or to recover all processing units in the redundant system without adverse effects. Computational redundancy may be provided with multiple processors and/or processing units within computers or computing platforms. In addition to isolating and recovering from internal faults, various embodiments allow computing units to detect faults in other system elements such as sensors, adaptors, actuators and/or effectors. Further embodiments may also include one or more actuator adaptor units that detect faults in other system components and issue discrete instructions to trigger a recovery. In some embodiments, the recovery is performed within one or two computing frames, or otherwise in a short enough time period so as to have only minimal affects, if any, on system performance or redundancy.

26 Claims, 2 Drawing Sheets

U.S. PATENT DOCUMENTS

| | | |
|---|---|---|
| 6,163,480 A | 12/2000 | Hess et al. |
| 6,178,522 B1 | 1/2001 | Zhou et al. |
| 6,272,386 B1 | 8/2001 | McLaughlin et al. |
| 6,389,335 B1 | 5/2002 | Vos |
| 6,434,436 B1 | 8/2002 | Adamy et al. |
| 6,532,550 B1 * | 3/2003 | Crew et al. .................. 714/11 |
| 2002/0152420 A1 * | 10/2002 | Chaudhry et al. ............ 714/11 |

* cited by examiner

HIGH INTEGRITY CONTROL SYSTEM ARCHITECTURE USING DIGITAL COMPUTING PLATFORMS WITH RAPID RECOVERY

FIELD OF INVENTION

This application relates generally to control systems and more specifically to a control system architecture using redundant processing units configured with rapid recovery elements.

BACKGROUND OF THE INVENTION

Control systems incorporating digital computers have been used for several years. In various applications of these computerized control systems, it is very important to maintain the integrity of the data produced by the digital computers, because the loss of data could result in the loss of a large amount of money or even the loss of life. Examples of critical applications may be found in industrial, aerospace, medical, scientific research and other fields.

A conventional control system suitable for use in high integrity applications is shown in FIG. 1. As known from conventional control theory, a computing units system for a plant is typically designed such that the resulting closed loop system exhibits stability, low-frequency command tracking, low-frequency disturbance rejection, and high-frequency noise attenuation. The plant is any object, process or other parameter capable of being controlled, such as an aircraft, spacecraft, medical equipment, electrical power generation, industrial automation, valve, boiler, actuator or other device.

The computing units system may be any analog or digital device that provides a control for plant behavior to be within specified criteria. The computing units system output (represented by vector $O_c(k)$), in conjunction with any external commands (represented by vector $C(k)$) is provided to the plant as appropriate, and an output vector ($O_p(k)$) corresponding to plant performance is provided to the computing units system as a closed-loop feedback signal. FIG. 1 also shows a vector of error inputs ($E(k)$), derived in a summation process of the computing units system output vector $O_c(k)$ and the external command vector, that typically result in plant adjustments.

In the aerospace field, for example, digital control systems are frequently interposed between the pilot and the flight control surfaces of an aircraft. Such units may include fly-by-wire, autopilot, and autoland systems, for example. In a fly-by wire system, in lieu of a pilot's controls being mechanically coupled (e.g., via cables or hydraulics) to the various primary flight control surfaces of the aircraft (such as the ailerons, elevators, and rudder), the position and movements of a pilot's controls are electronically read by sensors and transmitted to a computing system. The computing system typically sends electronic control signals to actuators of various types that are coupled to the primary flight control surfaces of the aircraft. The actuators are typically configured to move one or more control surfaces according to inputs provided by a pilot, or in response to feedback measured by a sensor on the aircraft. Failure of the control system, then, could have catastrophic effects on the controlled aircraft. Similarly, industrial, medical and other systems may be gravely affected by certain control system failures.

Various types of failures or faults may be encountered by conventional computing units found in control systems. A "hard fault" is a fault condition typically caused by a permanent failure of the analog or digital circuitry. For digital circuitry a "soft fault," in contrast, is typically caused by transient phenomena that may affect some digital circuit computing elements resulting in computation disruption but that does not permanently damage or alter the subsequent operation of the circuitry. Soft faults may be caused by electromagnetic fields created by high-frequency signals propagating through the computing system. For example, soft faults may also result from spurious intense electromagnetic signals, such as those caused by lightning that induce electrical transients on system lines and data buses which propagate to internal digital circuitry setting latches into erroneous states. Additionally, radar pulses, and the intense fields associated with electromagnetic pulses ("EMP") may also cause soft faults. Further, high-energy atomic particles (from a variety of sources, e.g., atmospheric neutrons, cosmic radiation, weapon detonation, etc.) may deposit sufficient energy in the bulk semiconductor material of a digital device to set electronic circuits into erroneous states. With the advent of smaller integrated circuits running at high speeds, soft faults are becoming more common, for example, in the radiation environment encountered by aircraft traveling at high altitudes. In such an environment, computing circuits containing state-of-the-art digital devices may be more susceptible to failure.

An erroneous result caused by soft faults may often be mitigated by rebooting the computer (e.g., by cycling the power off, then on again to initiate a power-on self-test). Such a procedure should result in the computer resuming proper operation. Rebooting may not always be available in digital computing systems that are used to control critical functions, however, such as in computing systems used in aircraft and other aerospace vehicles where state variables (e.g., control and logic state variables) and other parameters may not be readily recoverable by a conventional restart procedure. A control state variable in an avionics setting is typically a computed parameter that is developed over a period of time, and that therefore has an associated history based upon sensor or other data. Such variables are typically developed over long-term maneuvering or control of the plant. The loss of the control state variables associated with performing flight critical functions can be dangerous. For example, loss of control state variables during a landing sequence can cause an unpredictable system response that could result in a serious failure of the aircraft. In addition, a reboot procedure may require an undesirably large amount of time to complete, thus resulting in loss or degradation of plant control as the system reboots.

In the past, various forms of redundancy have been used in an attempt to reduce the effects of faults in critical systems. Multiple processing units, for example, may be used within a computing system. In a system with three processing units, for example, if one processor is determined to be experiencing a fault, that processor may be isolated and/or shut down. The fault may be corrected by correct data (such as the current values of various control state variables) being transmitted (or "transfused") from the remaining processors to the isolated unit. If the faults in the isolated unit are corrected, the processing unit may be re-introduced introduced to the computing system along with the other two processing units. This process may be termed a "recovery" process.

Other methods used to help ensure the continued operation of control systems include the use of dissimilar technology, dissimilar computation redundancy, distributed computation redundancy, equalization, and mid-value voting. Each of these methods, however, generally requires at least one processing unit to remain operational at all times to preserve state variables. While the above-described system may remain operational if all but one of the processing units experience a soft fault and the correctly-operating unit can be identified, the system will not operate properly if all of the processors simultaneously experience soft faults. Similarly, if a lone properly-operating unit cannot be identified within the system, the system will not recover, as there would be no identifiable operating unit with correct values for all of the state variables to be transfused to the remaining units. In addition, because of the transfusion of state variables from other processing units, the system recovery may be relatively slow to take place. It may therefore take several computing frames (which may take on the order of one half second or longer) for all processing units within the system to resume normal operation. In the meantime, redundant control is undesirably lost or degraded.

There is, therefore, a desire to have a more efficient system and technique for recovering from processor faults (such as soft faults) within a control system. More particularly, it would be desirable to have a more efficient system and technique consisting of coupling (through the use of mid-value voting and equalization) multiple processing units with the capability for rapid recovery such that effective redundancy can be preserved even if soft faults occur.

SUMMARY OF THE INVENTION

By incorporating computing units possessing processing units with the capability for rapid recovery, various embodiments of the invention use techniques such as mid-value voting, equalization, and the like to maximize the benefit of the redundancy available for the control system, thus resulting in a more stable and reliable system. An exemplary control system suitably includes a first computing unit and a second computing unit within a computing units system, with processing units that are configured to rapidly recover from soft faults. Each processing unit has the capability of running processes that generate a control signal to a plant effector. The control system may also include an adaptor coupling effector control signals, generated by the processing units within the computing units system, to an actuator or other device. The adaptor may be configured to detect when the performance (e.g., operator command unit performance) of processing units within, e.g., either the first or second computing units indicates a fault and to initiate a rapid recovery of the processing unit (within the computing unit), and, if appropriate, other units suffering from the fault (e.g., sensor units and/or operator command units). Additionally, the processing units within the first and second computing units may be configured to detect soft faults and to initiate a rapid recovery without input from the adaptor. A "fast recovery" or "rapid recovery" process is one that allows a processing unit to return to operability in a relatively short amount of time, such as within one computing frame. Additionally, such a recovery may be independent from transfused data provided by other redundant computers.

In addition to rapid recovery of processing units from soft faults, an exemplary system architecture achieves "transparent" recovery of processing units from soft faults such that full system redundancy can be restored. In other words, the recovery of a single processing unit or when appropriate, sensor or command unit does not adversely effect the operation of the control system and thus, the control function. Various computing systems associated with this invention may also provide additional benefits such as: high integrity fault detection; actuator position and control effector position monitoring where monitor thresholds can be time/magnitude adjusted; effector position equalization; and/or rapid redundancy (including dissimilar hardware or software) recovery from soft faults. Still further, an associated control system may include processing units with analytic redundancy as an additional fault tolerance element.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF EXEMPLARY EMBODIMENTS

Figure 1:
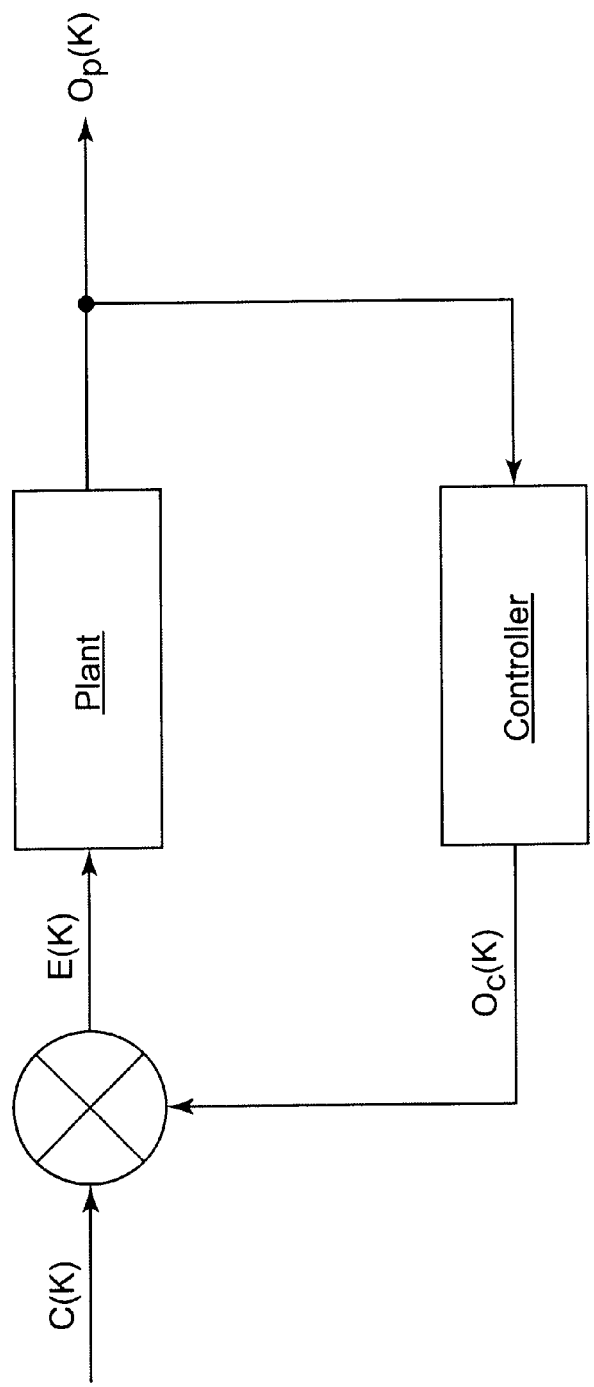
FIG. 1 is a conceptual block diagram overview of a control function.

According to various exemplary embodiments of the invention, a control system architecture suitably includes sufficient computation redundancy and control command management to either isolate and recover a faulted processor, or to recover all processing units of the redundant system without adverse effects. Computational redundancy may be provided with multiple processors or processing units within a computer or computing platform. In addition to isolating and recovering from internal faults, various embodiments allow processing units to detect faults in other system elements such as sensors, adaptors, actuators and/or effectors. Further embodiments may also include one or more actuator adaptor units, that through the detection of adverse errors, detect faults in other system components (that are in addition to the processing units) and issue discrete instructions to trigger a recovery. In some embodiments, processor recovery is performed within one computing frame and redundancy recovery is performed within one or two computing frames, or otherwise in a short enough time period so as to have only minimal affects, if any, on system performance.

Various embodiments of the present invention may be described herein in terms of various architecture elements and various processing steps. It should be appreciated that such elements may be realized by any number of hardware or structural components configured to perform specified operations. Such general applications that may be appreciated by those skilled in the art in light of the present disclosure are not described in detail herein. For purposes of illustration only, exemplary embodiments of the present invention will frequently be described herein in connection with aircraft avionics. The invention is not so limited, however, and the concepts and devices disclosed herein may be used in any control environment. Further, it should be noted that although various components may be coupled or connected to other components within exemplary system architectures, such connections and couplings can be realized by direct connection between components, or by connection through other components and devices located there between.

An exemplary control system architecture suitably includes multiple processors, each of which is configured to rapidly recover from various faults. The term "rapid recovery" indicates that recovery may occur in a very short amount of time. As used herein, a "computing frame" is the time needed for a particular processing unit to perform a repetitive task of a computation, e.g., the tasks that need to calculate continuously to maintain the operation of the controlled plant. The length of a computing frame is dependent upon the stability of the plant being controlled. In the aviation industry, for example, fighter jets are generally less stable than larger passenger jets. To continue with the example, a fighter jet may require computational updates every two milliseconds to maintain stability, while a more stable aircraft may only require a computational update every two hundred milliseconds or so to maintain the same level of stability. Thus, a computing frame in a fighter jet may be two milliseconds long while a computing frame for a passenger jet may be two hundred milliseconds long. To maintain the operation of a control system, it is generally desirable that a recovery from a soft fault takes place within about one or two computing frames. Recovery within a period of time that does not adversely affect control function performance is referred to herein as "essentially instantaneously," even if such recovery does not occur in a single or dual timeframe.

The ability of a processor to initiate recovery from a soft fault allows various embodiments of the present invention to aid in the recovery of the system as a whole. In addition, soft faults may be detected in the same computing frame (or within several frames) in which the faults occur. In embodiments wherein faults are detected within a single computing frame, each processor need only store control and logic state variable data for the immediately preceding frame for use in recovery purposes, which may take place essentially instantaneously. Accordingly, the dependence of each component upon other redundant components is suitably reduced.

Various embodiments may also include one or more adaptors coupling the computing units system to the control effectors. The adaptors may be configured to sense whether various computing elements are operating properly by, for example, determining if the output of a computing stage is within predetermined tolerances. In an embodiment used in aircraft systems, for example, the processing units may be used to issue control effectors position commands based on input data from an operator (human) and data from sensors. Since position commands are combined and monitored in adaptors that are connected to various actuators that, in turn, are coupled to control effectors (e.g., flight control surfaces), the movement of the control effector or (for better fault isolation in the actuation stage) actuator and effector can be monitored in a processing unit (using actuator and/or effector position data to determine if the actuation units moved the control effectors to the correct positions).

Figure 2:
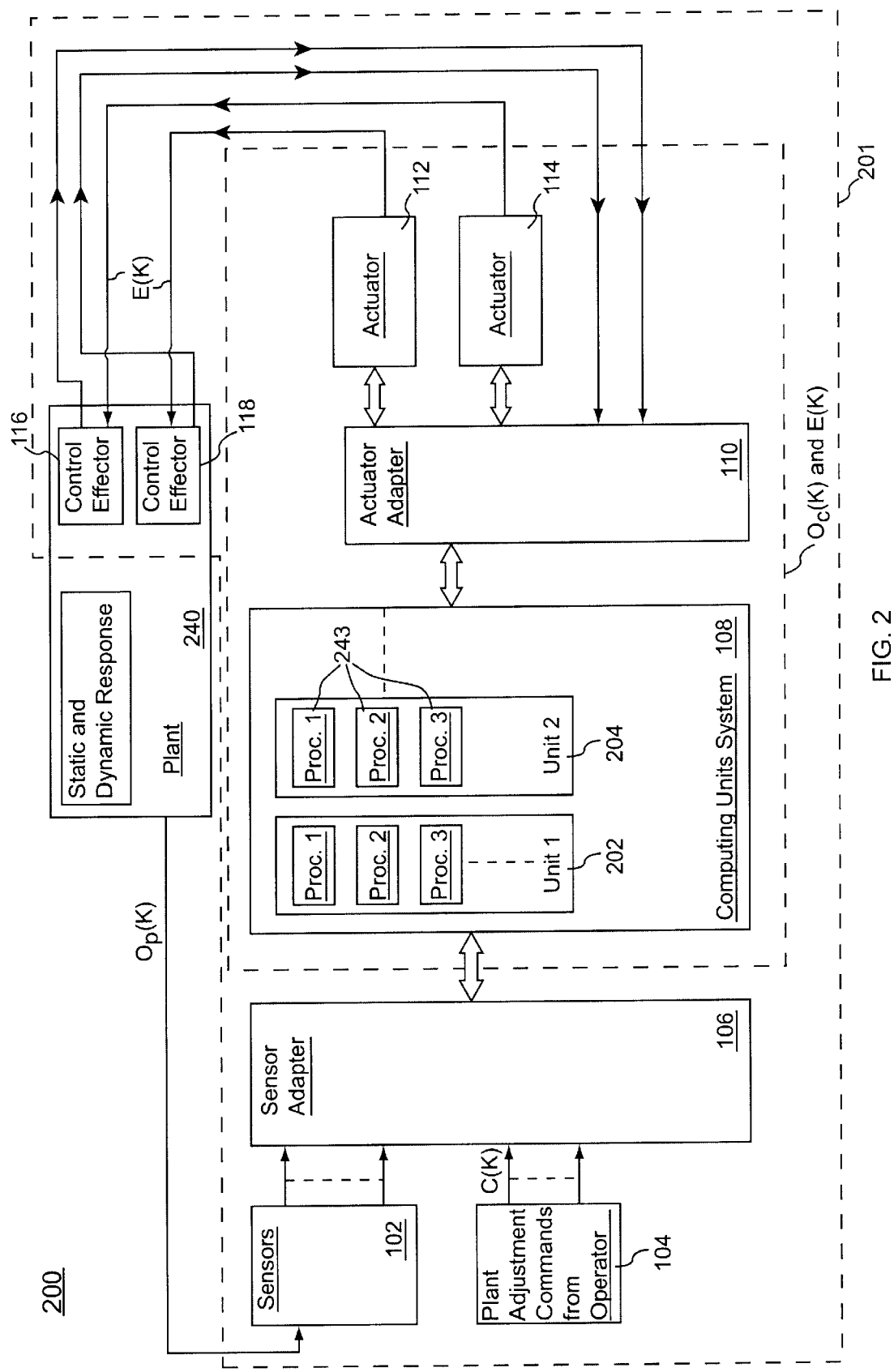
FIG. 2 is a block diagram of an exemplary control system architecture that provides a control function implementation.

Referring now to FIG. 2, an exemplary control system architecture 200 suitably includes a computing units system 108 communicating with a plant 240 via an actuator adaptor 110 and receiving inputs from a sensor set 102 and/or plant adjustment commands from an operator (pilot, etc.) 104 via sensor adaptor 106. The computing units system comprises two or more computing units having processing units. The computing units system 108 generally corresponds to the controller and summer illustrated in FIG. 1.

In an exemplary embodiment of the present invention, System 201 comprises essentially all of the components of FIG. 2 except for plant 240. Plant 240 is any device capable of being controlled by the controller and error derivation processes (computing units system) of 108, such as an aircraft, spacecraft, industrial equipment or process, electrical power generating equipment, medical equipment or device, valve, or the like. The interface between the output of computing units system 108 and plant 240 suitably includes an actuator adaptor 110 and actuators 112, 114 or other device capable of manipulating one or more control effectors 116, 118 to provoke a response by plant 240. Actuator adaptor 110 is any digital or analog processing device capable of providing an interface between computing units system 108 and actuators 112, 114. In various embodiments, actuator adaptor 110 suitably provides mid-value voting and selection, data concentration, and/or recovery triggers as appropriate, and as explained more fully below.

Computing units system 108 is any digital control device such as a digital computer or computing unit having one or more processors 202, 204. In an exemplary embodiment, computing units system 108 is a digital computing environment that includes multiple computing units 202, 204 to provide redundancy in processing. Each computing unit, e.g., unit 202 or unit 204, suitably includes one or more processing units 243 capable of executing various software processes. In the exemplary embodiment shown, each computing unit (202 or 204) is partitioned into multiple processing units 243 such that each computing unit (202 or 204) is capable of executing multiple, yet simultaneous processes. Each processing unit 243 includes its own operating system kernel and/or dedicated portion of system resources (e.g., disk space, memory, processor time, etc.). In various embodiments, computing units system 108 suitably handles-actuator and surface position monitors, surface position equalization, rapid recovery, redundancy management, and any appropriate recovery triggers. Although computing units system 108 is shown in the figure as having two computing units each containing three processing units 243, any number of processing units 243 could be provided in alternate embodiments, with each processing unit 243 supporting any number of processes.

In operation, computing units system 108 suitably receives feedback from sensors 102 and/or plant adjustment command instructions 104 from a human operator via sensor adaptor 106. Sensors 102 suitably include any number of gyroscopes, vehicle position sensors, airflow sensors, temperature sensors, and/or other sensing devices as may be appropriate for the particular implementation. Similarly, plant adjustment commands 104 may include any instructions from pilots, operators, remote control, or other sources of instructions. Sensor adaptor 106 suitably receives and concentrates data from sensors 102 and commands 104 to provide an interface to computing units system 108 as appropriate. Sensor adaptor 106 may also provide sensor validity monitoring to ensure that the sensors remain active, and may provide other functionality as appropriate. Each of the sensors 102 may optionally include rapid recovery elements if available and desired for the particular implementation.

Feedback control inputs are appropriately provided from sensors 102 (which corresponds to plant output vector $O_p(k)$ in FIG. 1) and commands 104 (which correspond to command vector $C(k)$ in FIG. 1) to computing units system 108. The data may be provided to each of the computing units 202, 204 through a bus, network or other communications medium. Each computing unit 202, 204 in turn provides the appropriate data to each of the processing units 243 each of which operates as a separate partitioned processing unit, as appropriate. In an IMA platform, for example, several software partitions, each providing a different function for the aircraft, would be executed on a single piece of digital hardware. Accordingly, each data set from redundant sensor and command data sets can be simultaneously processed in multiple isolated processing units 243 to implement a computing units system 108 for plant 240. Each processing unit 243 suitably provides one or more elements of an error vector E(k) (FIG. 1) to an actuator adaptor 110 controlling an effector 116, 118 that in turn provokes plant 240 outputs for plant control. In computing units system 108 the error vector E(k) is derived (FIG. 1) from the command vector 104 and control vector $O_c(k)$. In an alternate embodiment, actuator adaptor 110 and/or sensor adaptor 106 may be physically or logically combined into computing units system 108 and/or actuator 112, 114 as appropriate, or the architecture may be otherwise modified depending on the particular embodiment desired.

Actuator adaptor 110 suitably receives the multiple parallel control signals from processing units 243 and generates an appropriate control output to actuator 112 as a function of the parallel signals. In other words, an actuator adaptor 110 may be configured to produce a single output signal based on multiple, similar inputs to send the appropriate position command output to an actuator.

When actuator adaptor 110 senses that one of processing units 243 is not supplying signals that lies within certain tolerances, actuator adaptor 110 may be configured to transmit a signal to the computing unit in question to request the start of a rapid recovery cycle for that processing unit and also, if appropriate, to a sensor, etc., unit. One technique for computing the control output involves computing a "mid-value" whereby the signals from processes 243 are used to compute a mean and/or median of all of the values produced. This mid-valve is then compared to each signal from each of the processes 243. If a discrepancy exists between any particular value produced by any lane 243 and the mean and/or median of all the values (i.e., "the mid-values"), the actuator adaptor 110 suitably detects that an error condition exists and signals the appropriate processing units 243, sensing units, etc., to initiate a rapid recovery cycle. The discrepancy from the mid-values may be based upon any tolerance value, which can in turn be adjusted based upon desired conditions, as discussed more fully below. The detection of discrepancy from a mean or median value can be processed very rapidly, thus potentially resulting in an identification of an error within one or two frames of the value being produced, although identification times may vary from embodiment to embodiment. Accordingly, differences from mid-values may be computed based upon previous mid-values (i.e., values maintained from a previous frame), or can be computed in real time as appropriate. Furthermore, actuator adaptor could further include logic to detect any unreasonable values for the data results produced by processing unit 243. For example, any illogical values based on data rates, absolute values, etc., can be readily identified as erroneous and/or excluded from data processed at adaptor 110.

In a further embodiment, processing unit 243 may be configured to provide equalization between the effectors. In such embodiments, each of the effectors are slowly adjusted to drive the control signal generated by each processing unit 243 toward fine adjustments in the mid-value computed in actuator adaptor 110 so that the signals produced by each processing unit 243 result in an equalized command for control effector position. Such implementations typically do not require tight synchronization between the various processing units to achieve "equalized" command values because each effector position command signal is driven toward the other signals (i.e., toward a mid-value).

By implementing mid-value signal selection and equalization, actuator adaptor 110 is allowed to exploit rapid system recovery in a seamless way. That is, any errors in any processing unit 243 do not propagate beyond the adaptor 110 to affect the performance of system 200 in such a way as to adversely affect the control function. Because the error is very quickly confined, recovery of redundant control effector position commands can be processed very quickly. Accordingly, actuator adaptor 110 suitably initiates an appropriate recovery by computing unit 202, 204 by rapidly recovering any of the processing units 243 and/or appropriate sensor units, etc., upon discovery of a value that is outside a tolerance range, or that is otherwise observed to be erroneous. Such a system can quickly reset itself to the appropriate state to resume software execution, recover state variables saved from the previous frame, reinstate processing and institute recovery management that reestablishes the full degree of redundancy within the system 200. Alternatively for equalization, since each processing unit within computing units system 108 computes an average for effector position, each processing unit 243, may perform its own comparison between values for effector position and the average for effector position. If the difference exceeds a threshold, the processing unit can detect a faulty computing units system 108 to effector 116, 118 path and initiate a signal for fault management of the faulty path as appropriate.

Actuator adaptor 110 may be further configured to provide position feedback from actuator 112/114 and/or effectors 116/118 to computing units system 108. In such embodiments, actuator 112/114 suitably provides servo loop closure signals to actuator adaptor 110, as would be the case in a "classical" actuator architecture where the servo loop would be closed in actuator adaptor 110, also actuator adaptor 110 forwards actuator position signals to computing units system 108. If the control system architecture contains "smart" actuators 112, servo loop closure occurs at the actuator and actuator adaptor 110 would only provide actuator position signals to computing units system 108. Further, effector 116/118 position information may be provided to computing units system 108 via actuator adaptor 110. In this manner, actuator adaptor 110 suitably acts as an interface or gateway to translate between bus protocols of computing units system 108 and actuator 112/114 and effector 116/118. If actuator adaptor 110 senses a hard fault (i.e., an unrecoverable fault) then that appropriate processing unit 243 may be shut down or isolated as appropriate by actuator adaptor 110.

As described above, position commands from each processing unit 243 of computing units system 108 propagate to actuator adaptor 110. Actuator adaptor 110 transmits the position command signals to actuator 112, which then performs the requested commands as appropriate. In various embodiments, computing units system 108 can be configured to monitor sensor signals, which would include sensor adaptor 106, actuator adaptor 110, actuators 112 and 114, and/or control effectors 116 and 118. In the event that actuator 112, for example, is not operating within predetermined tolerances, actuator adaptor 110 may be configured to sense that condition and to deal with the situation, as described in further detail below. Control effectors 116, 118, etc., are typically configured to produce desired performance changes within plant 240. In embodiments wherein plant 240 is an aircraft, for example, control effectors 116 and 118 may be in the form of flight control surfaces such as rudders, ailerons, and/or elevators.

In various embodiments, each processing unit 243 is configured to be capable of rapid recovery. To accomplish rapid recovery, each processing unit 243 is configured to retrieve necessary control and logic state variables from internal memory locations such as a high integrity random access memory. An example of a high-integrity RAM is described in U.S. Pat. No. 6,163,480, which is incorporated herein by reference, although any other high-integrity memory technology could be used. Using the retrieved state variables and appropriate sensor date, each processing unit 243 can fully recover from a soft fault relatively quickly without requiring a data transfusion from another computing unit.

During normal operation, the output signals from each processing unit 243 can be monitored by actuator adaptor 110 to ensure that each of the computing units 202, 204 are producing results within a predetermined tolerance of the remaining computing units.

The rapid recovery cycle involves resetting the computing unit in question and beginning execution of the operational program at an appropriate location of the program execution cycle. Through the use of mid-value control signal selection, equalization and other techniques, it should not be necessary to synchronize with the remaining processing units 243 when initiating the rapid recovery cycle.

During a rapid recovery cycle, the tolerance used to determine if a processing unit 243 is operating properly may be relaxed for that particular processing unit 243. For example, during normal operation, there may be a predetermined tolerance, within which each of the processing units 243 is expected to operate. If a processing unit 243 produces values that are not within the predetermined tolerance, that processing unit 243 may be determined to be suffering from a soft fault, and a rapid recovery cycle may be initiated. During the rapid recovery cycle, the predetermined tolerance for the affected processing unit 243 may be relaxed somewhat such that further deviations are acceptable until unit 243 resumes normal operation. Furthermore, the output of that unit 243 may not be included in the derivation of the output to an actuator (e.g., computation of the mid-value) until the output comes within the relaxed tolerance. If the output comes within tolerance (indicating that the computing unit has stabilized) within a predetermined period of time T, it may once again be included in the output derivation. Before the predetermined time T has expired and unit 243 output has come within tolerance, requests for placing unit 243 into a rapid recovery state may be suspended or "masked" to allow unit 243 to recover. Once unit 243 has stabilized from the recovery cycle, unit 243 may be subjected to the previous tolerances. If the output does not come within tolerance within the predetermined time, another request to place unit 243 into a rapid recovery state may be issued.

An optional restart counter within actuator adaptor 110 may be configured to count the number of consecutive restart requests provided to each unit 243. If the number of requests, (N), exceeds a predetermined amount, (X), unit 243 may be labeled as "unrecoverable" and excluded from the derivation of the position command from the actuator adaptor. The predetermined amount X may be a safety parameter related to the dynamics of a plant 240 in a closed-loop system in which each unit 243 is located, representing the number of restarts for unit 243 and may range from, for example, between three and ten. In other embodiments, however, unit 243 is excluded upon a single fault, or upon many faults, as appropriate.

In still another embodiment, each of units 243 are configured to detect internal faults. In such a situation, unit 243 encountering a fault is able to detect the fault and trigger its own rapid recovery cycle, preferably (although not necessarily) in the same computation frame in which the fault occurs. In the meantime, the effected unit 243 transmits a signal to actuator adaptor 110 in order to indicate a reduction in the tolerances while the effected unit 243 is in the recovery process. As in the previous scenario, the recoverability of unit 243 is determined by the criteria associated with restart counters located within both unit 243 and the actuator adaptor 110. The restart counters, within units 243 is a means by which unit 243 is identified as unrecoverable. Again, if the number of requests N exceeds a number X over a predetermined time, unit 243 may be identified as unrecoverable and excluded from the derivation of the position command from the actuator adaptor 110.

In certain embodiments of the present invention, the recovery of computing units is transparent. That is, if one computing unit 202, 204 encounters a soft fault and proceeds to a recovery cycle, the remaining operating computing units 202, 204 are unaffected by the recovery cycle and the operation of the computing system as a whole is unaffected.

The above description presents exemplary modes contemplated in carrying out the invention. The techniques described above, however, are susceptible to modifications and alternate constructions from the embodiments shown above. Other variations and modifications of the present invention will be apparent to those of ordinary skill in the art, and it is the intent of the appended claims that such variations and modifications be covered. For example, various embodiments that are specific to use in aircraft and avionics, it should be understood that the invention is not so limited and can be used in a variety of systems regardless of the usage of the system. In addition the order of the described steps is not necessarily material, unless otherwise noted. Furthermore, various steps can be altered, added, or deleted to the embodiments described and illustrated in the application without a deleterious effect on the present invention.

It should be appreciated that the particular implementations shown and described herein are examples of the invention and are not intended to otherwise limit the scope of the present invention in any way. The connecting lines shown in the various figures contained herein are intended to represent exemplary functional relationships and/or physical or logical couplings between the various elements. It should be noted that many alternative or additional functional relationships, physical connections or logical connections may be present. The corresponding structures, materials, acts and equivalents of all elements in the claims below are intended to include any structure, material or acts for performing the functions in combination with other claimed elements as specifically claimed. Moreover, the steps recited in any method claims may be executed in any order. The scope of the invention should be determined by the appended claims and their legal equivalents, rather than by the examples given above. No item or component is essential to the practice of the invention unless the element is specifically described herein as "essential" or "critical."

What is claimed is:

1. A control system architecture for controlling a plant, the system comprising:

a computing units system having a plurality of redundant processing units, each of the processing units being configured to generate at least one of a plurality of redundant position signals for the plant and where each processing unit is configured to self initiate rapid recovery; and an adaptor coupled to the computing units system and configured to receive each of the position signals, to compute a mid-value for the position signals, and to initiate a rapid recovery in one of the redundant processing units if the difference between the position signal generated by that processing unit and the mid-value exceeds a threshold value.

2. The system of claim 1 further comprising an actuator coupled to the adaptor, wherein the actuator is configured to receive an actuator control signal from the adaptor.

3. The system of claim 2 further comprising an effector actuated by the actuator to produce a desired result in the plant as a function of the actuator control signal.

4. The system of claim 1 wherein the rapid recovery is essentially instantaneous.

5. The system of claim 1 wherein the redundant processing units are configured such that there is no synchronization between the processing units.

6. The system of claim 1 wherein the computing units system is configured to receive a feedback signal from the plant.

7. The system of claim 1 wherein each of the redundant processing units are configured to receive at least one of a plurality of position feedback signals from the effectors, and wherein the effector position feedback signals are communicated from the adaptor to the processing units by way of the computing units system.

8. The system of claim 7 wherein the effector position feedback signals are configured in the redundant processing units to equalize the position signals produced by the redundant processing units.

9. The system of claim 7 wherein the effector position feedback signals are configured to further equalize the position signals produced by the redundant processing units, by providing small adjustments, to the mid-value.

10. A method of controlling a plant, the method comprising:

generating a plurality of redundant position signals, each of the position signals being generated by one of a plurality of redundant processing units and where each processing unit is configured to self initiate rapid recovery;

computing a mid-value for the redundant position signals; and initiating a rapid recovery in one of the redundant processing units if the difference between the redundant position signal generated by that processing unit and the mid-value exceeds a threshold value.

11. The method of claim 10 further comprising the step of restoring state variables from a hardened memory within each processing unit to the redundant processing unit during the rapid recovery of that processing unit.

12. The method of claim 10 wherein the rapid recovery is performed essentially instantaneously.

13. The method of claim 10 wherein the self initiating step is performed by one of the redundant processing units.

14. The method of claim 10 wherein initiating steps are performed by an adaptor coupled to the processing unit.

15. The method of claim 10 further comprising adjusting thresholds in the adaptor in response to the initiation of a rapid recovery in one of the redundant processing units.

16. The method of claim 10 further comprising the step of equalizing the plurality of redundant position signals as a function of the average of the positions of each effector.

17. A method of operating an actuator adaptor, the method comprising:

receiving a plurality of position signals, each of the position signals being produced by one of a plurality of processing units;

computing a mid-value for the position signals;

selecting a control output as a function of plurality of the position signals; and initiating a rapid-recovery in at least one of the plurality of processing units when the difference between at least one of the position signals and the mid-value exceeds a pre-determined threshold.

18. A method of recovering a control system, the method comprising:

providing redundant processing units, wherein each of said redundant processing units is configured to perform a rapid recovery from a fault;

sensing a fault in one of said redundant processing units; and initiating an essentially instantaneous rapid recovery in one of said redundant processing units in response to said fault.

19. The method of claim 18 wherein said sensing step occurs within one or all of said redundant of the redundant processing units.

20. The method of claim 18 wherein an adaptor is coupled to a computing units system containing said redundant processing units, and wherein said sensing step occurs within said adaptor.

21. The method of claim 18 further comprising storing values of control and logic state variables in each of said redundant processing units.

22. The method of claim 21 wherein said recovery of each redundant processing unit comprises resetting said redundant processing unit to an initial state and loading the processing unit with said stored status of various control and logic state variables.

23. The method of claim 18 wherein said recovery executes within one computing frame.

24. The method of claim 18 wherein the recovery of a said one processing unit does not effect a said second processing unit or any other said redundant processing unit.

25. The method of claim 18 wherein the recovery of said second processing unit does not effect said first processing unit or any other said redundant processing unit.

26. The method of claim 18 wherein the recovery executes within one computing frame.

* * * * *